(12) United States Patent
Ehben et al.

(10) Patent No.: US 8,812,341 B2
(45) Date of Patent: Aug. 19, 2014

(54) METHOD AND SYSTEM FOR OPTIMIZING PROCESS MODELS

(75) Inventors: Thomas Ehben, Friedeburg (DE); Stefan Horn, Erlangen (DE); Thilo Tetzner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 410 days.

(21) Appl. No.: 13/268,166

(22) Filed: Oct. 7, 2011

(65) Prior Publication Data

US 2012/0089435 A1   Apr. 12, 2012

(30) Foreign Application Priority Data

Oct. 7, 2010 (DE) .......................... 10 2010 042 125

(51) Int. Cl.
*G06F 17/00* (2006.01)
(52) U.S. Cl.
USPC ........................................................ 705/7.27
(58) Field of Classification Search
CPC ................................................. G06Q 10/0633
USPC ....................................................... 705/7.27
See application file for complete search history.

(56) References Cited

U.S. PATENT DOCUMENTS 6,311,144 B1 * 10/2001 Abu El Ata ...................... 703/2
2006/0064486 A1 * 3/2006 Baron et al. ................... 709/224

OTHER PUBLICATIONS

Projactivity Projektmanagement-Simulation, Getoq Consulting, Bremen; http://www.getoq.de/download/semiarinformationen090820.pdf , 2 pages, Aug. 20, 2009.
Rauch-Gebbensleben, et al., "Generierung und Visualisierung des Zielkorridors in Projektplanen mit stochastischen Einflussgrossen", Otto-von-Guericke-Universitat Magdeburg; 14 pages, Mar. 3, 2008.

* cited by examiner

*Primary Examiner* — Thomas Dixon
(74) *Attorney, Agent, or Firm* — King & Spalding L.L.P.

(57) ABSTRACT

Within methods and systems for computer-aided optimization of process models, defined specifications and associated release criteria (quality gates) are available for every work stage. The specifications include service documents, result features that are to be generated in a work stage, and budget details and the latest end time for a work stage. The release criteria (quality gates) can identify the results of a work stage as successful and can assess the fulfillment of a work stage. A reference for all work stages simulates the model based on a fictitious sample project, interference variables are introduced, the project implementation is simulated for each interference variable, respectively, the deviations from the reference run are automatically determined, respectively, for each interference variable, and an analysis of the influence of the release criteria (quality gates) regarding compliance with the budget and the schedule is performed based on the determined deviations from the reference run.

15 Claims, 2 Drawing Sheets

METHOD AND SYSTEM FOR OPTIMIZING PROCESS MODELS

CROSS-REFERENCE TO RELATED APPLICATIONS

This application claims priority to German Patent Application No. 10 2010 042 125.1 filed Oct. 7, 2010, the contents of which is incorporated herein by reference in its entirety.

TECHNICAL FIELD

The invention relates to a method and a system, based on simulation methods, for optimizing process models that are used for project implementation in the field of plant engineering or in the field of solutions business. The invention further relates to a computer program and a computer-readable medium.

BACKGROUND

The projects that are implemented in the field of plant engineering and solutions business are characterized by a high level of complexity, this being the result of the large number of data points, many and diverse dependencies, and considerable division of labor. In practical terms, the workflow for the plant engineering in this case extends from planning and design of the plant, through construction to commissioning. Depending on the boundaries and the agreed scope of services, the workflow also includes the operation, servicing (maintenance), modernization and reconversion phases. A plurality of trades, i.e. technical specialized disciplines, are involved in each of these phases. Adherence to deadlines, cost optimization and planning reliability always have a high priority in the field of plant engineering. Critical success factors for achieving these objectives are, firstly, a high quality of the work stages to be performed, i.e. the results of individual work stages must reliably fulfill their requirements (as defined in specifications, requirements, or procurement and performance specifications, for example) and, secondly, specifications and release criteria must be so selected that their fulfillment will reliably ensure a smooth implementation process.

In practice, abstract models of the implementation process have evolved for specific classes of solutions or plants (industrial domains) in each case. These frequently comprise acceptance criteria (so-called quality gates) for individual work routines or work modules and their results. These models are derived from positive and negative experiences relating to actual project implementations, and are continuously maintained and updated. This is usually done subjectively on the basis of the relevant findings of those involved, and is usually done manually. Moreover, inconsistencies can very easily creep into an implementation model.

SUMMARY

According to various embodiments, a method and a system for optimizing process models for the purpose of project implementation in the field of plant engineering or in the field of solutions business can be provided, thereby allowing systematic and objective optimization of any desired process models.

According to an embodiment, a method for the computer-aided optimization of process models for the purpose of project implementation in the field of plant engineering or in the field of solutions business, wherein defined specifications and associated release criteria (quality gates) are available for every work stage of the project implementation, wherein the specifications comprise documents for the scope of services, the features of the results that are to be generated in a work stage, and details concerning the available budget and the latest end time for a work stage, and wherein the release criteria (quality gates) describe the criteria according to which the results of a work stage can be identified as successful and whereby the fulfillment of a work stage can be objectively assessed, and wherein the specifications are available for the whole project implementation and the process model is represented by the specifications, may comprise the following steps:
 a) creating a reference run for all of the work stages of a project implementation by simulating the process model on the basis of a fictitious sample project;
 b) introducing interference variables into all of the work stages of the reference run;
 c) simulating the project implementation for each interference variable that has been introduced in each case;
 d) determining the deviations from the reference run for each interference variable that has been introduced in each case; and
 e) analyzing the influence of the release criteria (quality gates) in respect of compliance with the budget and the schedule, based on the determined deviations from the reference run.

According to a further embodiment, the analysis of the influence of the release criteria (quality gates) may include the effects on the project execution of removing a release criterion, and/or the sensitivity of the overall project performance to non-compliance or delayed satisfaction of a release criterion (quality gate). According to a further embodiment, release criteria (quality gates) that are identified as particularly critical to the success of the project can be optimized. According to a further embodiment, release criteria (quality gates) that are identified as particularly uncritical to the success of the project can be removed or made less stringent. According to a further embodiment, the adaptations to the release criteria (quality gates) can be implemented in the process model and are validated by means of a further simulation.

According to another embodiment, a computer program for optimizing process models for the purpose of project implementation in the field of plant engineering or in the field of solutions business, may carry out a method as defined above when the program is executed on a computer.

According to yet another embodiment, a computer-readable medium may comprise instructions which, when they are executed on a suitable computer, execute a method as described above.

According to yet another embodiment, a system for optimizing process models for the purpose of project implementation in the field of plant engineering or in the field of solutions business, wherein defined specifications and associated release criteria (quality gates) are available for every work stage of the project implementation, wherein the specifications comprise documents for the scope of services, the features of the results that are to be generated in a work stage, and details concerning the available budget and the latest end time for a work stage, and wherein the release criteria (quality gates) describe the criteria according to which the results of a work stage can be identified as successful and whereby the fulfillment of a work stage can be objectively assessed, and wherein the specifications are available for the whole project implementation and the process model is represented by the specifications, may comprise the following means: a) means for creating a reference run for all of the work stages of a project implementation by simulating the process model on the basis of a fictitious sample project; b) means for introducing interference variables into all of the work stages of the reference run; c) means for simulating the project implementation for each interference variable that has been introduced in each case; d) means for determining the deviations from the reference run for each interference variable that has been introduced in each case; and e) means for analyzing the influence of the release criteria (quality gates) in respect of compliance with the budget and the schedule, based on the determined deviations from the reference run.

According to a further embodiment of the system, the analysis of the influence of the release criteria (quality gates) may include the effects on the project execution of removing a release criterion and/or the sensitivity of the overall project performance to non-compliance or delayed satisfaction of a release criterion (quality gate).

BRIEF DESCRIPTION OF THE DRAWINGS

Exemplary embodiments is explained below and is illustrated in the drawing, in which.

DETAILED DESCRIPTION

Figure 1:
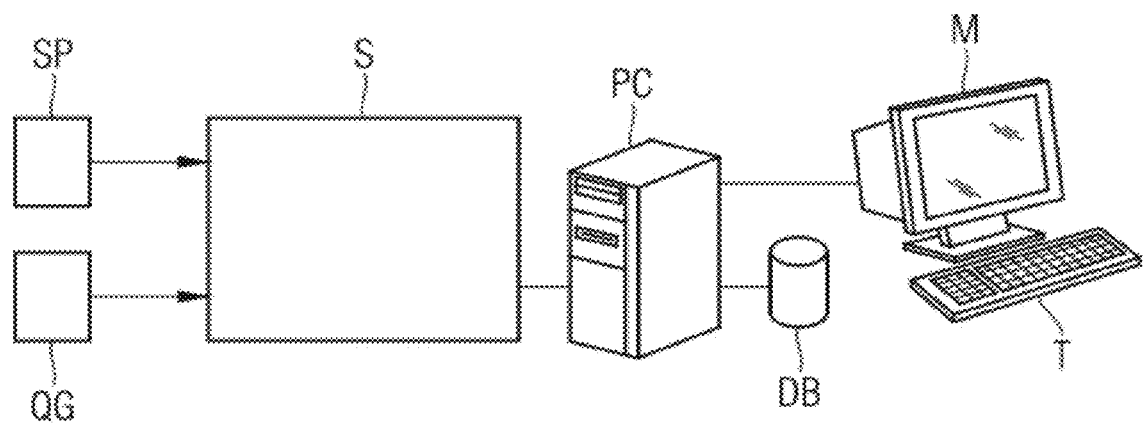
FIG. 1 shows an exemplary schematic overview diagram of system components for carrying out the method according to various embodiments.

According to various embodiments a method for the computer-aided optimization of process models for the purpose of project implementation in the field of plant engineering or in the field of solutions business, wherein defined specifications and associated release criteria (quality gates) are available for every work stage of the project implementation, wherein the specifications comprise documents for the scope of services, the features of the results that are to be generated in a work stage, and details concerning the available budget and the latest end time for a work stage, and wherein the release criteria (quality gates) describe the criteria according to which the results of a work stage can be identified as successful and whereby the fulfillment of a work stage can be objectively assessed, and wherein the specifications are available for the whole project implementation and the process model is represented by the specifications, may comprise the following steps:
a) creating a reference run for all of the work stages of a project implementation by simulating the process model on the basis of a fictitious sample project;
b) introducing interference variables into all of the work stages of the reference run;
c) simulating the project implementation for each interference variable that has been introduced in each case;
d) determining the deviations from the reference run for each interference variable that has been introduced in each case; and
e) analyzing the influence of the release criteria (quality gates) in respect of compliance with the budget and the schedule, based on the determined deviations from the reference run. The method allows an objective evaluation of a process model. The results of the reference run are a benchmark (norm) against which other process models can be objectively compared and evaluated. The method can be realized on a standard computer (e.g. PC) by means of suitable software. Standard simulations can be applied, e.g. using automatic systems or iterative methods. The sample project should advantageously cover all essential supplies and services, disciplines and phases of a real project. This procedure applies in principle to all sectors and business types or business models where projects are implemented. Examples include product development projects, research projects, industrial system projects and industrial plant projects, and also modernization projects and servicing projects. Process models or model representations can be stored and managed on a typical CM system (configuration management system). Simulation is understood essentially to mean the modeling of a system as per the specifications (documents or artifacts which describe the system) in a computer program. This allows a comparison between the desired system behavior and that which is reproduced in computer runs. In a first embodiment, the analysis of the influence of the release criteria (quality gates) includes the effects on the project execution of removing a release criterion and/or the sensitivity of the overall project performance to non-compliance or delayed satisfaction of a release criterion (quality gate). For each of the fictitious interference variables, the whole project run is simulated and the deviations from the ideal run (reference run) are measured in respect of overall schedule and budget compliance in this case. For each release criterion (quality gate), it is thus possible to see how sensitively the overall project performance reacts to non-compliance with or delayed satisfaction of a quality gate, and how the removal of a quality gate affects the overall project execution.

In a further embodiment, provision is made for optimizing those release criteria (quality gates) which are considered particularly critical to the success of the project. Particularly critical quality gates are optimized as appropriate, e.g. by formulating other criteria which are possibly more stringent, or by dividing a quality gate into a plurality of quality gates, or by dividing the associated work module (work stage) into submodules. These adaptations can be carried out on the basis of data that has been collected and structured. For example, this can take the form of decision tables containing decision criteria and the associated adaptations that must be carried out in each case. A further possibility consists of an automatic system that has a database and makes the necessary decisions by means of algorithms.

In a further embodiment, provision is made for removing or making less stringent those release criteria (quality gates) that are considered particularly uncritical to the success of the project. Particularly uncritical quality gates (e.g. quality gates which merely check the compliance in terms of formalism and do not represent a check of a work stage in terms of content) can be removed or made less stringent, such that less effort is required to satisfy them. These adaptations can likewise be performed automatically, e.g. on the basis of data that has been collected and structured. For example, this can take the form of decision tables containing decision criteria and the associated adaptations that must be carried out in each case. A further possibility consists of an automatic system that has a database and makes the necessary decisions by means of algorithms. For example, by means of decision criteria that are stored in Excel tables or decision tables, and the associated adaptations that are to be carried out in each case.

In a further embodiment, provision is made for the adaptations to the release criteria (quality gates) to be incorporated in the process model and validated by means of a further simulation. This can take place iteratively until a satisfactory result is achieved. The real implementation process is then adapted to the optimized model. This avoids over-engineering.

According to further embodiments, a system for optimizing process models for the purpose of project implementation in the field of plant engineering or in the field of solutions business, wherein defined specifications and associated release criteria (quality gates) are available for every work stage of the project implementation, wherein the specifications comprise documents for the scope of services, the features of the results that are to be generated in a work stage, and details concerning the available budget and the latest end time for a work stage, and wherein the release criteria (quality gates) describe the criteria according to which the results of a work stage can be identified as successful and whereby the fulfillment of a work stage can be objectively assessed, and wherein the specifications are available for the whole project implementation and the process model is represented by the specifications, may comprise the following means:
a) means for creating a reference run for all of the work stages of a project implementation by simulating the process model on the basis of a fictitious sample project;
b) means for introducing interference variables into all of the work stages of the reference run;
c) means for simulating the project implementation for each interference variable that has been introduced in each case;
d) means for determining the deviations from the reference run for each interference variable that has been introduced in each case; and
e) means for analyzing the influence of the release criteria (quality gates) in respect of compliance with the budget and the schedule, based on the determined deviations from the reference run. The system allows an objective evaluation and systematic optimization of any desired project implementation processes by moving towards predefinable optimization objectives such as costs, adherence to deadlines or planning reliability.

In a further embodiment, the analysis of the influence of the release criteria (quality gates) includes the effects on the project execution of removing a release criterion and/or the sensitivity of the overall project performance to non-compliance or delayed satisfaction of a release criterion (quality gate). Over-engineering is therefore avoided along the whole process chain. This is done by automatically identifying and eliminating unnecessary instances of controlling. Failures, particularly so-called "non-conformance costs" and delays, are identified and reduced.

Furthermore, according to further embodiments, a corresponding computer program and a computer-readable medium (e.g. CD, DVD, floppy disk) can be provided. This increases the flexibility of use and facilitates the distribution and commercial marketing of the method according to various embodiments.

The projects that are implemented in the field of plant engineering and solutions business are characterized by a high level of complexity, this being the result of the large number of data points, many and diverse dependencies, and considerable division of labor. In practical terms, the workflow for the plant engineering in this case extends from planning and design of the plant, through construction to commissioning. Depending on the boundaries and the scope of supplies or scope of services that have been agreed, the workflow also includes the operation, servicing (maintenance), modernization and reconversion phases. A plurality of trades, i.e. technical specialized disciplines, are involved in each of these phases. Adherence to deadlines, cost optimization and planning reliability always have the highest priority in the field of plant engineering. Critical success factors for achieving these objectives include:
a) high quality, i.e. the results of individual work stages (or work modules) must reliably fulfill their requirements, e.g. as defined in specifications, requirements (requirements descriptions), or performance specifications;
b) specifications and release criteria must be selected such that their fulfillment will reliably ensure a smooth implementation process;
c) at the same time, the implementation process should be hampered as little as possible by formal activities which do not add value.

Existing Solution

In practice, so-called abstract models of the implementation process evolve in each case for a class of solutions or plants, also referred to as industrial domains. These frequently comprise acceptance criteria or so-called quality gates for individual work routines and their results. These models are derived from positive and negative experiences relating to actual project implementations, and are usually continuously updated. The number of quality gates accumulates over the number of instances (i.e. implemented projects), resulting in inefficiency and sometimes even in inconsistencies. The approach of the process model that is derived from practical projects also has the disadvantage that comparison with alternative implementation processes is not possible, and that objective metrics for the evaluation of the implementation performance are not available, and therefore an evaluation can only be intuitive and subjective.

According to various embodiments, a method and a system are proposed for analyzing and systematically improving the process model for the implementation of any desired projects in the fields of plant engineering and solutions business. In this case, it is presupposed that all work stages of the project implementation are represented by documents:
a) specifications/requirements: these documents/artifacts describe the scope of services and the features of the results that must be produced by a work stage or a work module. They also specify the latest time point at which the work stage (work module) must be completed and the extent to which human, financial and other resources (including sub-budgets) are available;
b) release criteria (so-called quality gates): these describe the criteria according to which the results of a work stage (work module) can be identified as successful and whereby its fulfillment can be objectively assessed.

These descriptions (requirements, procurement specification, performance specification, schedule, budget plan, etc.) of the work stages are available for the whole of the implementation process and represent the model.

A fictitious sample project is now simulated with reference to this model. Compliances (or excesses) in respect of time and budget are measured in this case. This simulation is used as an ideal run or reference run. One or more fictitious interference variables are now deliberately introduced into each of the modeled work modules (work stages).

Examples of such interference variables are:
a work module does not appear to fulfill a requirement or quality gate;
a work module appears to fulfill its requirements or quality gates, but the results (on which the other work modules are based) are actually incorrect;
a work module is completed later than planned;
a work module exceeds its sub-budget.

The whole project run is simulated for each of the fictitious interference variables that has been introduced, and the deviations from the ideal run in respect of overall compliance with schedule and budget are measured in this way.

It is then possible to infer the following for each quality gate:

How sensitively does the overall project performance react to non-compliance or delayed satisfaction of a quality gate?

How extensive would the effect on the project execution be if the quality gate was removed?

In a subsequent step, on the basis of the information relating to these quality characteristics of the process model, the following adaptations are carried out:

particularly critical gates are optimized, e.g. by formulating other criteria which are possibly more stringent, by dividing a quality gate into a plurality of quality gates (so-called sub-quality gates), or by dividing the associated work module into submodules;

particularly uncritical quality gates are removed or made less stringent, such that less effort is required to satisfy them. These adaptations can be performed automatically on the basis of stored decision tables. Moreover, these adaptations are implemented in the model and validated by means of a further simulation. As soon as an overall satisfactory result is achieved, a subsequent step provides for the real implementation process to be adapted in accordance with the optimized model.

The method according to various embodiments has the following advantages in particular:

The described method allows the systematic optimization of any desired project implementation processes, thereby moving closer to the optimization objectives of costs, adherence to deadlines and planning reliability.

So-called over-engineering is avoided along the entire process chain. This is done in particular by eliminating unnecessary instances of controlling.

Failures, in particular so-called NCCs (non-conformance costs) and delays, are significantly reduced in this way.

The method according to various embodiments also represents a combination of analytical and empirical approaches.

The prerequisite preparation of the process model also results in an intensive analysis of the real process and all subprocesses. Key weak points are thereby already exposed in advance.

By means of the simulative and subsequently iterative validation of quality gates, reliable quantitative measured variables for the measures and process changes effected by the optimization can be calculated by means of before/after comparisons.

FIG. 1 shows an exemplary schematic overview diagram of system components for carrying out the method according to various embodiments. The simulator S which is used for simulating the process model receives as input the specifications SP (requirements, procurement specification, performance specification, project plan with milestones, etc.) and release criteria or so-called quality gates QG relating to the individual documents. The simulator S creates a reference run for all work stages of a project implementation by simulating the process model on the basis of a fictitious sample project. The process model is represented by the specifications SP in this case. The computer-aided simulation is performed on a computer PC with output means M (e.g. monitor, display) and keyboard T (or further input means such as a mouse, for example).

In this case, the specifications SP and release criteria QG for a process model are stored in a database DB which can be accessed by the simulation program S. The database DB is also used for storing results and intermediate results, and for archiving. The database DB is also used for storing the possible interference variables which can be introduced into the work stages of the reference run. The deviations from the reference run, which are caused by the interference variables, are automatically determined and analyzed by the computer PC with the aid of suitable software. An analysis of the influence of the release criteria (quality gates) QG is also performed automatically by the PC with the aid of suitable software, particularly in respect of which effects are produced in the project execution if a release criterion QG is removed, or which effects are produced in the event of a non-compliance or delayed satisfaction of a release criterion QG.

Figure 2:
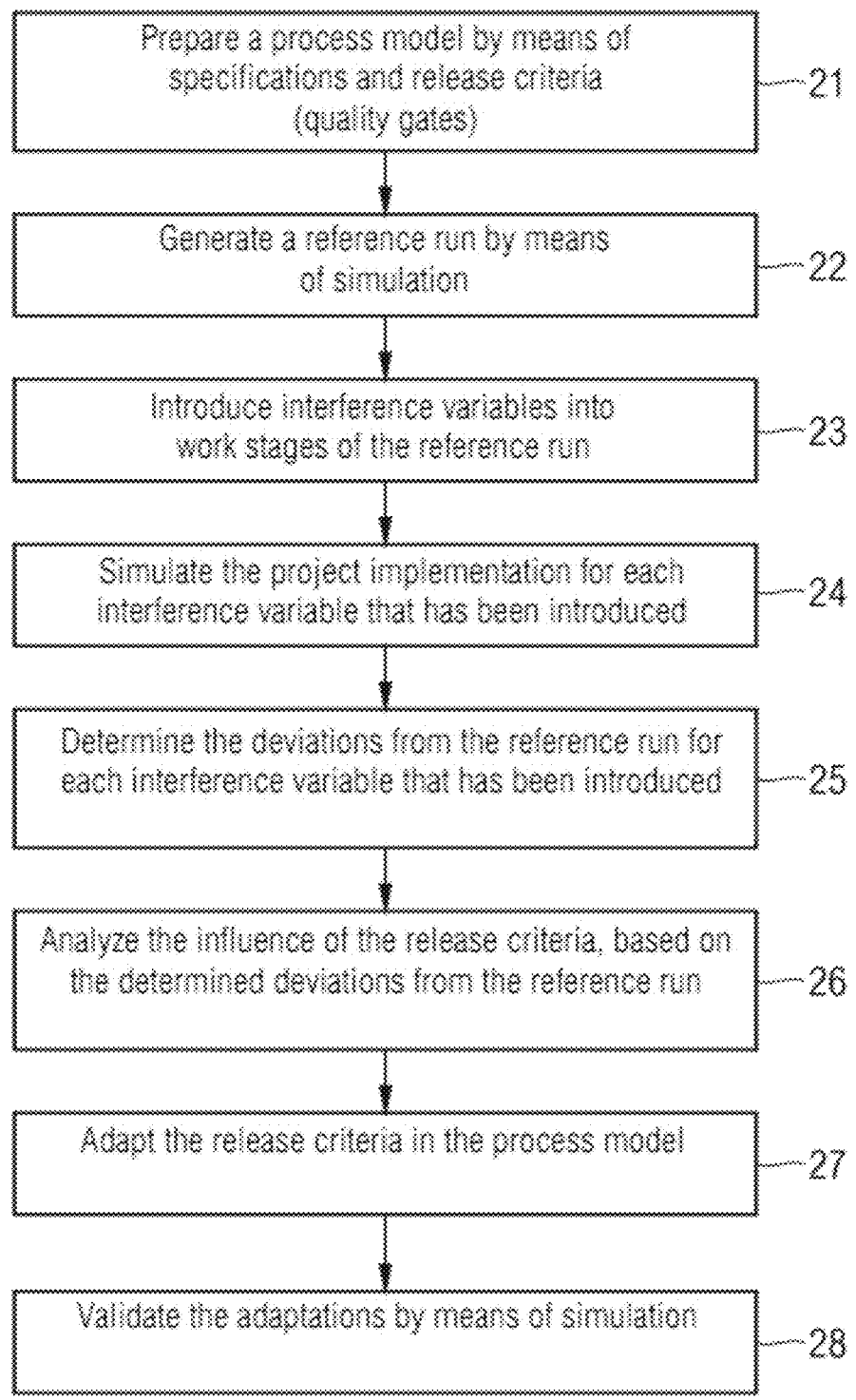
FIG. 2 shows method steps for carrying out the method according to various embodiments.

FIG. 2 shows the method steps 21 to 28 for performing the method according to various embodiments. The process model is specified by specifications (documents; artifacts, e.g. CAD models or spreadsheets (tables, worksheets)). These specifications SP and the associated release criteria QG are usually stored in a database DB which can be accessed by the simulation program S for computer-aided simulation (step 21).

In the step 22, a reference run (ideal run) for all work stages of a project implementation is generated by the simulator S by simulating the process model on the basis of a fictitious sample project.

In the step 23, interference variables are introduced into all work stages of the reference run. Examples of such interference variables are e.g. a work module does not appear to fulfill a requirement or quality gate, or a work module appears to fulfill its requirements, but the results (on which the other work modules are based) are actually incorrect, or a work module is completed later than planned, or a work module exceeds its sub-budget.

In the step 24, a simulation of the project implementation is carried out for each interference variable that has been introduced.

In the step 25, the deviations from the reference run are determined for each interference variable that has been introduced. In particular, the deviations in respect of the overall schedule and budget compliance are determined. It is then possible to infer the following for each quality gate QG:

How sensitively does the overall project performance react to non-compliance or delayed satisfaction of a gate?

Or how extensive is the effect on the project execution if a quality gate QG is removed?

In the step 27, the release criteria are adapted on the basis of the analysis information that has been obtained. The following adaptations are conceivable:

particularly critical quality gates QG are optimized as applicable, e.g. by formulating other criteria (acceptance criteria) which are possibly more stringent, or by dividing a quality gate QG into a plurality of quality gates, or by dividing the associated work module into submodules;

particularly uncritical quality gates QG are removed or made less stringent, such that less effort is required to satisfy them. Care must naturally be taken to ensure that the overall quality is not adversely affected by these adaptations in this case.

In the step 28, the adaptations that have been carried out are validated by means of a further simulation S. As soon as an overall satisfactory result is achieved, the real implementation process is adapted in accordance with the optimized process model. The steps 21 to 28 are performed automatically with the aid of a computer. In this case, the simulation program S can access information that is stored in the database DB, e.g. decision tables or empirical values from previous projects.

Method and system for computer-aided optimization of process models for the purpose of project implementation in the field of plant engineering or in the field of solutions business, wherein defined specifications and associated release criteria (quality gates) are available for every work stage of the project implementation, wherein the specifications comprise documents for the scope of services, the features of the results that are to be generated in a work stage, and details concerning the available budget and the latest end time for a work stage, and wherein the release criteria (quality gates) describe the criteria according to which the results of a work stage can be identified as successful and whereby the fulfillment of a work stage can be objectively assessed, and wherein the specifications are available for the whole project implementation and the process model is represented by the specifications, wherein a reference run for all work stages of a project implementation is created by simulating the process model on the basis of a fictitious sample project, wherein interference variables are introduced into all work stages of the reference run, wherein the project implementation is simulated for each interference variable that has been introduced in each case, wherein the deviations from the reference run in each case are automatically determined for each interference variable that has been introduced, and wherein an analysis of the influence of the release criteria (quality gates) in respect of compliance with the budget and the schedule is performed on the basis of the determined deviations from the reference run.

LIST OF REFERENCE CHARACTERS 21-28 Method steps
SP Specification
QG Release criterion
S Simulator
PC Computer
DB Database
M Monitor
T Keyboard

What is claimed is:

1. A method for the computer-aided optimization of a process model, comprising:
preparing a computer-based process model for a project implementation having multiple work stages, the process model defining specifications and associated release criteria for every work stage of the project implementation,
wherein the specifications comprise, for each work stage, documents regarding the scope of services associated with respective work stages, details of results that are to be generated in the work stage, and budget and scheduling details for the work stage, and
wherein the release criteria describe, for each work stage, criteria for determining whether the results of the work stage are successful;
storing the specifications and release criteria of the process model in a database;
executing a simulation program, by a processor, to create a reference run for all of the work stages of the project implementation by simulating the process model based on a predefined fictitious sample project;
executing the simulation program, by the processor to introduce interference variables into all of the work stages of the reference run;
executing the simulation program, by the processor, to simulate the project implementation for each interference variable that has been introduced into each work stage;
determining, by the processor, deviations from the reference run for each interference variable that has been introduced into each work stage;
analyzing, by the processor, an influence of the release criteria with respect to compliance with the budget and scheduling details defined by the process model, based on the determined deviations from the reference run; and
adapting, by the processor, the release criteria for at least one work stage defined by the process model based on the analysis results.

2. The method according to claim 1, wherein the analysis of the influence of the release criteria includes at least one of the effects on the project execution of removing a release criterion and the sensitivity of the overall project performance to non-compliance or delayed satisfaction of a release criterion.

3. The method according to claim 1, wherein release criteria that are identified as particularly critical to the success of the project are optimized.

4. The method according to claim 1, wherein release criteria that are identified as particularly uncritical to the success of the project are removed or made less stringent.

5. The method according to claim 3, wherein the adaptations to the release criteria are implemented in the process model and are validated by means of a further simulation.

6. A computer program product comprising a non-transitory computer readable medium storing instructions which when executed by a computer processor perform a method for the computer-aided optimization of a process model, comprising the following steps:
accessing, from a database, a computer-based process model for a project implementation having multiple work stages, the process model defining specifications and associated release criteria for every work stage of the project implementation,
wherein the specifications comprise, for each work stage, documents regarding the scope of services associated with respective work stages, details of results that are to be generated in the work stage, and budget and scheduling details for the work stage, and
wherein the release criteria describe, for each work stage, criteria for determining whether the results of the work stage are successful;
executing a simulation program by a processor, to create a reference run for all of the work stages of the project implementation by simulating the process model based on a predefined fictitious sample project;
executing the simulation program, by the processor, to introduce interference variables into all of the work stages of the reference run;
executing the simulation program, by the processor, to simulate the project implementation for each interference variable that has been introduced into each work stage;
determining, by the processor, deviations from the reference run for each interference variable that has been introduced into each work stage;
analyzing, by the processor, an influence of the release criteria with respect to compliance with the budget and scheduling details defined by the process model, based on the determined deviations from the reference run; and
adapting, by the processor, the release criteria for at least one work stage defined by the process model based on the analysis results.

7. The computer-readable medium according to claim 6, wherein the analysis of the influence of the release criteria includes at least one of the effects on the project execution of removing a release criterion and the sensitivity of the overall project performance to non-compliance or delayed satisfaction of a release criterion.

8. The computer-readable medium according to claim 6, wherein release criteria that are identified as particularly critical to the success of the project are optimized.

9. The computer-readable medium according to claim 6, wherein release criteria that are identified as particularly uncritical to the success of the project are removed or made less stringent.

10. The computer-readable medium according to claim 8, wherein the adaptations to the release criteria are implemented in the process model and are validated by means of a further simulation.

11. A system for optimizing a process model, comprising:
a processor;
a database storing as computer-based process model for a project implementation having multiple work stages, the process model defining specifications and associated release criteria for every work stage of the project implementation,
wherein the specifications comprise, for each work stage, documents regarding the scope of services associated with respective work stages, details of results that are to be generated in the work stage, and budget and scheduling details for the work stage, and
wherein the release criteria describe, for each work stage, criteria for determining whether the results of the work stage are successful;
a simulation program stored in non-transitory computer readable media and executable by the processor to:
create a reference run for all of the work stages of the project implementation by simulating the process model based on a predefined fictitious sample project;
introduce interference variables into all of the work stages of the reference run;
simulate the project implementation for each interference variable that has been introduced into each work stage;
an analysis program stored in non-transitory computer readable media and executable by the processor to:
determine the deviations from the reference run for each interference variable that has been introduced into each work stage;
analyze the influence of the release criteria in respect of compliance with the budget and scheduling details defined by the process model, based on the determined deviations from the reference run; and
adapt, by the processor, the release criteria for at least one work stage defined by the process model based on the analysis results.

12. The system according to claim 11, wherein the analysis of the influence of the release criteria includes at least one of the effects on the project execution of removing a release criterion and the sensitivity of the overall project performance to non-compliance or delayed satisfaction of a release criterion.

13. The system according to claim 11, wherein release criteria that are identified as particularly critical to the success of the project are optimized.

14. The system according to claim 11, wherein release criteria that are identified as particularly uncritical to the success of the project are removed or made less stringent.

15. The system according to claim 13, wherein the adaptations to the release criteria are implemented in the process model and are validated by means of as further simulation.

* * * * *